United States Patent [19]

Dunn et al.

[11] Patent Number: 4,468,164

[45] Date of Patent: Aug. 28, 1984

[54] METHOD AND APPARATUS FOR FEEDING RAW MATERIAL TO A FURNACE

[75] Inventors: Charles S. Dunn, Pataskala; Stephen Seng, Bladensburg, both of Ohio

[73] Assignee: Owens-Corning Fiberglas Corporation, Toledo, Ohio

[21] Appl. No.: 405,659

[22] Filed: Aug. 5, 1982

[51] Int. Cl.³ .............................................. C03B 3/00
[52] U.S. Cl. .................................. 414/165; 414/301; 414/588; 65/135; 65/335
[58] Field of Search ............... 414/160, 165, 208, 301, 414/588; 65/27, 135, 335

[56] References Cited

U.S. PATENT DOCUMENTS

| | | | |
|---|---|---|---|
| 841,869 | 1/1907 | Hower | 414/588 |
| 3,929,445 | 12/1975 | Zippe | 65/335 |
| 4,385,918 | 5/1983 | Dunn et al. | 414/165 X |

*Primary Examiner*—Joseph E. Valenza
*Assistant Examiner*—Stuart Millman
*Attorney, Agent, or Firm*—Ronald C. Hudgens; Patrick P. Pacella

[57] ABSTRACT

The feeding of batch material to a melting furnace is disclosed. The batch materials are choke fed to keep the total batch crust plus molten glass depth constant. The batch level keeps the arc electrodes submerged and helps promote arc stability and melting efficiency.

4 Claims, 2 Drawing Figures

METHOD AND APPARATUS FOR FEEDING RAW MATERIAL TO A FURNACE

TECHNICAL FIELD

This invention relates to the feeding of batch material to a melting furnace. The batch feeder was designed for arc melters having vertical electrodes. The batch materials are fed to the furnace to improve glass level control.

BACKGROUND ART

Arc-type melting furnace have been proposed in the past for the melting of glass batch, slag, minerals, and other pulverant raw materials.

Typically, the arc is generated beneath a raw material layer of "blanket" which encompasses the lower ends of vertical electrodes and which forms an insulating top layer over the molten material in the furnace. Melting primarily takes place at the location of the spaced electrodes beneath the raw material blanket, and those raw materials which are located at the arcing locations melt more quickly and preferentially with respect to other portions of the batch blanket.

Arc stability melting efficiency requires that a body of unmelted batch be constantly present at each of the arcing locations. Thus, the prior art formation of batch material or batch blanket of substantially equal depth across the top of the molten materials has resulted in the melting of that limited amount of material at each arcing location, and the batch material from other portions of the blanket is either inefficiently melted or must flow to the arcing location before it can be melted.

One of our prior inventions provides for the feeding of batch material to an arc melting furnace so that the batch material is delivered to specific arcing locations within the furnace, and a more efficient, non-uniform batch material distribution is obtained to promote both the stability of the arc and melting efficiency.

DISCLOSURE OF INVENTION

Our present invention provides for the feeding of batch material to an arc melting furnace to form a uniform blanket of batch material on the surface of the molten material. The batch materials are choke fed to keep the total batch crust plus molten glass depth ($d_b + d_g$ in FIG. 1) constant. This allows for improved molten glass level control. The batch level keeps the arc electrodes submerged and helps promote arc stability and melting efficiency.

More specifically, and in its preferred form, the present invention proposes the gravitational feeding of batch material to a furnace through a vertical feed chute which terminates inside the furnace at a location on the batch blanket. Material from the chute is distributed internally of the furnace by means of a rotatable trough which receives the material from the chute and which directs it laterally onto the blanket. The trough rotates about the vertical axis and has a spreader bar attached to it. Since the chute is filled with batch at all times, the trough supports the column of batch. As the batch material is melted at the arc electrodes, the rotating motion of the spreader bar adds additional material as needed. This operation continues at all times and is sufficient to compensate for the amount of batch which is melted at the arc electrodes.

BEST MODE OF CARRYING OUT INVENTION

We conveniently will describe the batch feeder of this invention by the structure disclosed in the FIGURES. While this invention has been illustrated by this arrangement, it also may take a variety of other forms. For example, while the feeder was designed for an arc melting furnace, it also may be used with a furnace which employs joule effect melting.

Figure 1:
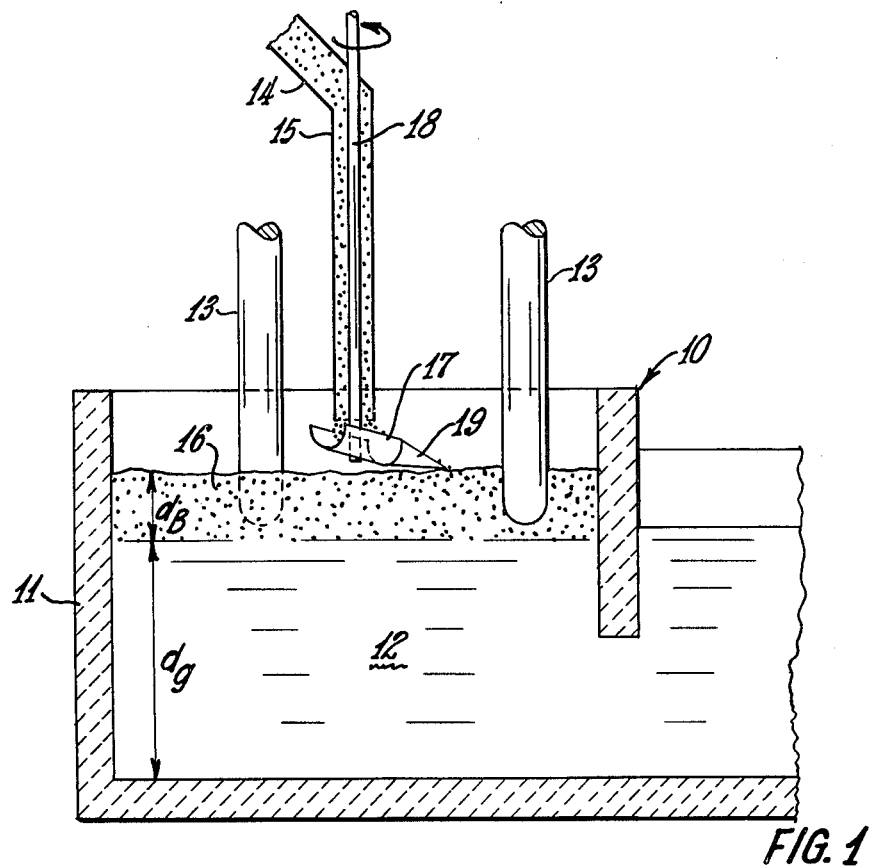
FIG. 1 is a side elevational view of a melting furnace equipped with the batch feeder of this invention.

FIG. 1 generally shows a conventional arc melting furnace indicated by reference numeral 10 having refractory sidewall 11 containing a body 12 of molten material, for example, glass batch, basalt or the like. Arc electrodes 13 vertically extend into furnace 10 and terminate slightly above the body 12 of molten material. Each electrode 13 defines an arcing location at its lower end.

Batch materials 14 are supplied to furnace 10 by chute 15 supported by appropriate support means not shown. Chute 15 is essentially filled with batch materials 14 at all times. As a result of this choke feed, batch material 14 provides a plug flow to batch blanket 16. Chute 14 extends into furnace 10 and terminates near the upper surface of batch blanket 16. In this manner, batch material 14 typically piles up on trough 17 near the surface of batch blanket 16. A rotatable shaft 18 extends axially through chute 15 and is driven by a means and motor, not shown. Fixed to the lower end of shaft 18 is trough 17, which preferably is formed of sheet metal and is "U" shaped in cross-section to provide an upwardly facing interior surface. Spreader bar 19 extends from trough 17 and provides an outwardly flare for spreading batch material uniformly on blanket 16.

Figure 2:
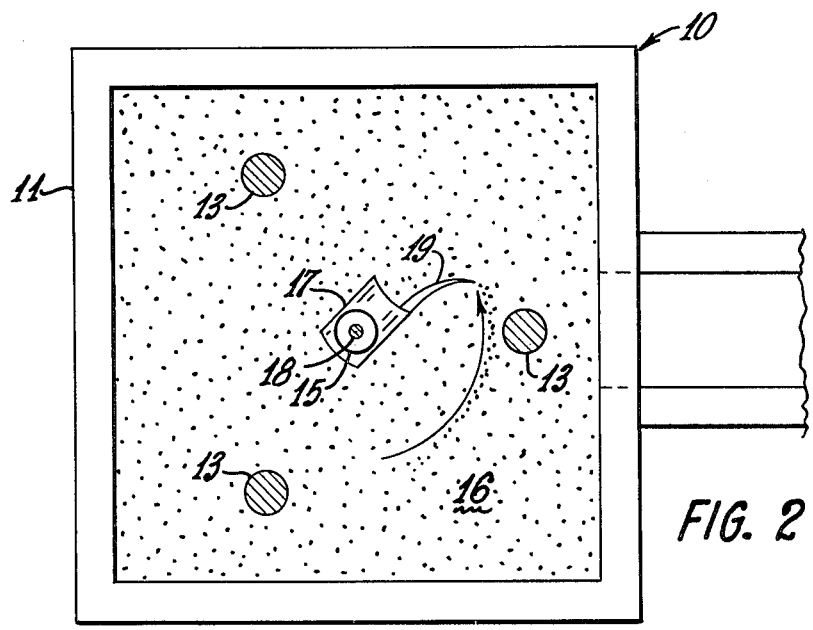
FIG. 2 is a top view showing the spreader bar in more detail.

FIG. 2 is a top view showing the flare of spreader bar 19.

INDUSTRIAL APPLICABILITY

The invention consists of a stationary feed pipe through which batch is choke fed into the furnace. At the end of the feed pipe there is an angled trough and a curved spreader bar. The trough and spreader bar are rotated by means of a motor located above the static feed chute. As batch material is melted at the arc electrode, the rotating motion of the trough and the spreader bar add additional batch material as needed. Choke feeding raw materials in this manner also keeps the total batch crust plus glass depth thickness ($d_b + d_g$ in FIG. 1) constant. This allows for molten glass level control which uses feedback control from a forehearth bubbler control forehearth glass level via modulating the arc power input.

In operation, the batch is heaped or piled on and around trough 17 and then spread uniformly on blanket 16 filling any voids in the surface usually at the arc electrodes. This operation is continuous and provides a constant uniform batch cover to the molten material.

In the utilization of arc melting furnaces for the melting of basalt, glass batch, metals or the like, or for ore reduction, the charge to be melted is introduced in pulverant form into a furnace or crucible having a plurality of top-entering, vertically suspended electrodes. The electrodes typically are pre-baked, cylindrical carbon sections which are screwed together and which are consumed during the melting process.

The electrical current is supplied to the electrodes, typically three in number, from a transformer as the electrodes are individually suspended in the furnace or crucible for independent vertical displacement. The electrodes are individually adjusted vertically to maintain a constant voltage at each electrode-batch interface location, and the amperage varies as the resistance in the furnace changes.

The electrodes must be raised and lowered independently of one another with varying furnace operating conditions, e.g., as the resistance of the arc changes upon variations in the molten material level and the molten material temperature, as the electrode is consumed, and as cooler incoming raw materials are fed into the furnace. As a result, the electrodes are frequently moved up and down as they individually hunt for the desired balance point. Prior to the present invention, a stable arc and efficiency of melting was at least partially dependent upon batch blanket. This invention provides for uniform distribution of batch material internally of the arc melting furnace and stabilizes one of the variables for efficient arcing operations.

We claim:

1. An apparatus for feeding batch material to a melting furnace containing a body of molten material with a blanket of unmelted batch material on the surface thereof comprising:
    a feed chute having its discharge end located in the furnace at or near the batch blanket,
    means for continuously supplying batch material to the feed chute wherein the chute is essentially filled with batch material at all times,
    means for discharging batch material from the chute,
    means for spreading the discharged batch material wherein the spreader means is a spreader bar extending from the discharge means with an outwardly flare, and
    means for continuously rotating the discharging and spreading means.

2. An apparatus according to claim 1 wherein the means for discharging batch material is a rotatable trough aligned with the discharge end of the chute.

3. An apparatus according to claim 2 wherein the trough is "U" shaped in cross section to provide an upwardly facing interior surface.

4. An apparatus for feeding batch material to an arc melting furnace containing a body of molten material with a blanket of unmelted batch material on the surface and having a plurality of arcing locations defined by vertical arc electrodes having a total thickness thereof comprising:
    a feed chute having its discharge end located in the furnace at or near the batch blanket,
    means for continuously supplying batch material to the feed chute wherein the chute is essentially filled with batch material at all times,
    a rotatable trough aligned with the discharge end of the feed chute,
    means for spreading the batch material on the batch blanket extending outwardly from the trough, and
    means for continuously rotating the trough and spreader means to keep the total batch blanket and molten material thickness constant.

* * * * *